(12) United States Patent
Harper

(10) Patent No.: US 10,226,147 B2
(45) Date of Patent: Mar. 12, 2019

(54) BEVERAGE BREWING DEVICE

(71) Applicant: David Harper, Pomona, CA (US)

(72) Inventor: David Harper, Pomona, CA (US)

( * ) Notice: Subject to any disclaimer, the term of this patent is extended or adjusted under 35 U.S.C. 154(b) by 155 days.

(21) Appl. No.: 15/400,869

(22) Filed: Jan. 6, 2017

(65) Prior Publication Data

US 2018/0192809 A1 Jul. 12, 2018

(51) Int. Cl.
*A47J 31/043* (2006.01)
*A47J 31/20* (2006.01)

(52) U.S. Cl.
CPC ............. *A47J 31/043* (2013.01); *A47J 31/20* (2013.01)

(58) Field of Classification Search
CPC ................................ A47J 31/043; A47J 31/20
See application file for complete search history.

(56) References Cited

U.S. PATENT DOCUMENTS

| | | | | |
|---|---|---|---|---|
| 2,245,389 | A * | 6/1941 | Cremer | A47J 31/44 99/305 |
| 4,903,586 | A * | 2/1990 | King | A47J 31/408 99/287 |
| 5,349,897 | A * | 9/1994 | King | A47J 31/18 99/287 |
| 6,182,554 | B1 * | 2/2001 | Beaulieu | A47J 31/3628 99/289 R |
| D551,901 | S | 10/2007 | Hulett et al. | |
| D562,051 | S | 2/2008 | Hulett et al. | |
| 7,673,555 | B2 | 3/2010 | Nosler et al. | |
| 8,371,211 | B2 | 2/2013 | Nosler et al. | |
| 8,621,982 | B2 | 1/2014 | Nosler et al. | |
| 8,794,127 | B2 | 8/2014 | Nosler et al. | |
| 8,910,563 | B2 | 12/2014 | Hulett et al. | |
| 8,944,354 | B2 | 2/2015 | Hulett et al. | |
| 9,218,633 | B2 | 12/2015 | Hulett et al. | |
| 10,034,569 | B2 * | 7/2018 | Khalifa | A47J 31/20 |
| 2014/0106042 | A1 | 4/2014 | Nosler et al. | |
| 2015/0157039 | A1 | 6/2015 | Nosler et al. | |
| 2017/0188746 | A1 * | 7/2017 | Ebersold | A47J 31/002 |

* cited by examiner

*Primary Examiner* — Anthony J Weier
(74) *Attorney, Agent, or Firm* — Klein, O'Neill & Singh, LLP

(57) ABSTRACT

A beverage brewing device is configured to brew beverages such as coffee and tea. A brewing canister having a filter at a bottom end is held partially within a receiving beaker, and a seal is created between the canister outer surface and the beaker inner surface. Brewing media such as coffee grounds and brewing fluid such as hot water are added to the canister, mixed, and allowed to brew. At a desired time, the receiving beaker is moved relative to the brewing canister so that the brewing canister is partially removed from the receiving beaker. As such, a vacuum is formed between the bottom end of the brewing canister and the receiving beaker. The filter stops brewing media from flowing into the receiving beaker, but the vacuum draws the brewed beverage through the brewing media and filter and into the receiving beaker.

12 Claims, 16 Drawing Sheets

BEVERAGE BREWING DEVICE

BACKGROUND

The present disclosure relates to the field of devices and methods for brewing beverages.

Many techniques are used for preparing brewed beverages such as coffee and tea. Most commonly, tea is prepared by pouring hot water into a cup with a bag filled with brewing material (i.e., tea leaves). The water absorbs flavors and such from the tea leaves and is brewed to become a tea beverage. However, eventually the tea bag must be manually removed, and it is often difficult to judge how long the tea bag should be left in the cup for an optimum brewed tea.

Coffee is often brewed by pouring hot water over coffee grounds that are supported by a filter. The water flows through the grounds, absorbs flavors and such from the coffee grounds, and flows through the filter into a cup. While this technique of making coffee is fairly easy and ubiquitous, it is criticized for its relatively-low absorption of flavors from the coffee grounds.

Many coffee connoisseurs prefer a technique known as the "French Press" as leading to good tasting coffee and efficient use of coffee grounds. In the French Press technique, coffee grounds and hot water are mixed in a container so that the hot water more thoroughly absorbs flavor and such from the coffee grounds during the brewing process. After allowing the hot water and coffee grounds to brew for a time, a user then pushes a filter through the container, separating the coffee grounds from the brewed beverage by forcing the grounds to the bottom of the container. The brewed coffee is then poured from the container. Notably, the brewed coffee should be poured from the container immediately, or it risks mixing too long with the coffee grounds. Also, the French Press technique is often time-consuming, and it may be difficult to consistently control parameters such as water temperature, size of coffee grounds, and the ratio of ground coffee to water. French Press equipment can also be difficult or inconvenient to clean.

SUMMARY

There is a need in the art for a device and method for brewing beverages that enables full mixing of the brewing fluid and the brewing media, but thoroughly removes brewing media from the brewed beverage, that is easy to clean, and that enables users to easily control brewing parameters.

In accordance with some preferred embodiments, the present specification describes a brewing device, comprising a frame, a lift that is movable relative to the frame, a brewing canister and a receiving beaker. The frame has a first holder, and the lift has a second holder. The brewing canister is configured to be supported by one of the first and second holders, the brewing canister having an outer diameter and having a filter, a brewing chamber defined within the brewing canister above the filter. The receiving beaker is configured to be supported by the other of the first and second holders, the receiving beaker having an inner diameter that is greater than the outer diameter of the brewing canister. The brewing canister and receiving beaker are configured so that the brewing canister can be inserted into the receiving beaker so that the filter of the brewing canister is within the receiving beaker, and an upper portion of the brewing canister is not within the receiving beaker. A sealing member is configured to establish a seal between the brewing canister and the receiving beaker when the brewing canister is inserted into the receiving beaker. The brewing chamber is configured to receive a fluid and a brewing media therewithin so as to brew a brewed fluid therefrom. When the lift is moved relative to the frame, the receiving beaker is moved vertically relative to the brewing canister between a first position, in which the brewing canister is inserted into the receiving beaker and a second position, in which the brewing canister is completely removed from the receiving beaker.

In some embodiments, when the receiving beaker is in the first position and fluid and brewing media are disposed in the brewing chamber, moving the lift so that the receiving beaker is moved toward the second position will create a vacuum between the filter and the receiving beaker, and the vacuum will draw brewed fluid from the brewing chamber through the filter and into the receiving beaker.

Some such embodiments additionally comprise a detent mechanism configured to temporarily stop movement of the lift toward the second position. The detent mechanism is configured to stop movement of the lift at a third position between the first and second positions, and the seal between the receiving beaker and the brewing canister is still established when the lift is at the third position.

In some embodiments, when the receiving beaker is in the second position, the receiving beaker can be removed from the respective first or second holder independently from the brewing canister. In additional embodiments, when the receiving beaker is in the second position, the brewing canister can be removed from the respective first or second holder independently from the receiving beaker. In yet additional embodiments, the brewing canister comprises a connector configured to engage the first holder so that the brewing canister is prevented from moving vertically relative to the frame. In further embodiments, the receiving beaker is configured to be supported by the second holder so that the receiving beaker moves vertically with the lift. In yet further embodiments, the second holder is configured so that when the receiving beaker is engaged with the second holder on the lift, and the brewing canister is engaged with the first holder, the receiving beaker is aligned with the brewing canister.

In additional embodiments, the sealing member is supported by the brewing canister. In some such embodiments, the brewing canister comprises a first end and a second end, the filter being disposed at or adjacent the second end, and wherein the sealing member is arranged between the first end and the second end.

In other such embodiments in which the brewing canister comprises a first end and a second end, the brewing canister is open at the first end, and a removable cap is disposed at the second end, the removable cap comprising a filter seat configured to releasably receive the filter. The filter is held securely in place when the cap is attached to the brewing canister, the filter being removable from the filter seat when the cap is removed from the brewing canister. Some such embodiments additionally comprise a filter support that interchangeably fits into the filter seat of the cap in place of the filter, and additionally comprises a compliant filter configured to be supported by the filter support when the cap is attached to the brewing canister.

In accordance with additional embodiments, the present specification presents a method of preparing a brewed fluid, comprising positioning a brewing canister at least partially within a receiving beaker, the brewing canister comprising a filter, a seal being established between an outer surface of the brewing canister and an inner surface of the receiving beaker; placing a brewing media and a brewing fluid into the brewing canister, the brewing media and filter configured so that the brewing media is prevented from flowing through the filter; allowing the brewing media and brewing fluid to steep so that the brewing fluid is brewed into the brewed fluid; and moving the receiving beaker relative to the brewing canister without breaking the seal so that a vacuum is created between the filter and the receiving beaker. Brewed fluid is drawn by the vacuum from the brewing canister through the filter and into the receiving beaker, but brewing media is retained in the brewing canister.

Additional embodiments additionally comprise moving the receiving beaker relative to the brewing canister sufficiently to break the seal and remove the brewing canister from the receiving beaker.

Further embodiments comprise loading the brewing canister onto a frame and loading the receiving beaker onto a lift so that the brewing canister is above the receiving beaker, and also moving the receiving beaker relative to the brewing canister so that the brewing canister is partially within the receiving beaker and the seal is established.

Yet further embodiments comprise moving the receiving beaker downwardly relative to the brewing canister to create the vacuum between the filter and the receiving beaker. Some such embodiments comprise moving the lift vertically in order to move the receiving beaker relative to the brewing canister. Further embodiments comprise moving the receiving beaker downwardly sufficient so that the seal is broken and the brewing canister is completely removed from the receiving beaker. Yet additional embodiments comprise removing the receiving beaker having the brewed fluid therein from the lift.

DESCRIPTION

Figure 1:
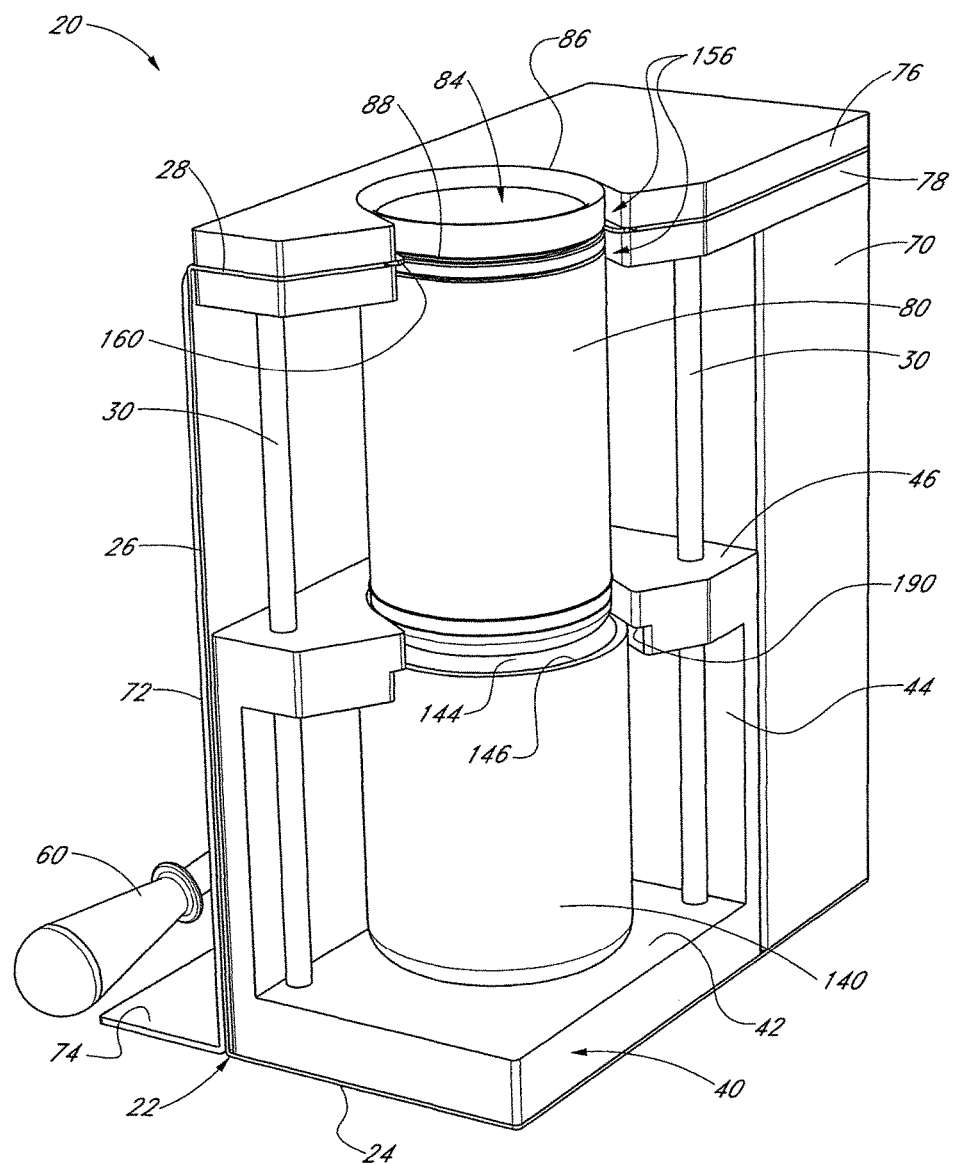
FIG. 1 is a perspective view of a brewing device having features in accordance with a preferred embodiment.

With initial reference to FIGS. 1-5, an embodiment of a brewing device 20 is depicted. The illustrated brewing device comprises a frame 22 that, in the illustrated embodiment, is made up of a base portion 24, side portion 26 and top portion 28. In the illustrated embodiment, the frame 22 is substantially rigid, and is constructed of a durable, strong material such as a metal or a hard plastic. The illustrated embodiment employs three spaced-apart guide shafts 30 that extend from the base portion 24 to the top portion 28, and can be secured in position by fasteners 32 such as, for example, screws or bolts. Preferably, the guide shafts 30 are substantially parallel to one another.

A lift 40 comprises a bottom part 42, side part 44 and an upper part 46. Apertures are formed through the lift upper part 46 and lift bottom part 42 and are sized and positioned so as to accommodate guide shafts 30 extending therethrough. As such, the lift 40 is slidable up and down along the guide shafts 30. In the illustrated embodiment, linear bearings 50 are embedded in the lift upper part 46 and lift bottom part 42 and in engagement with at least one of the guide shafts 30.

Figure 5:
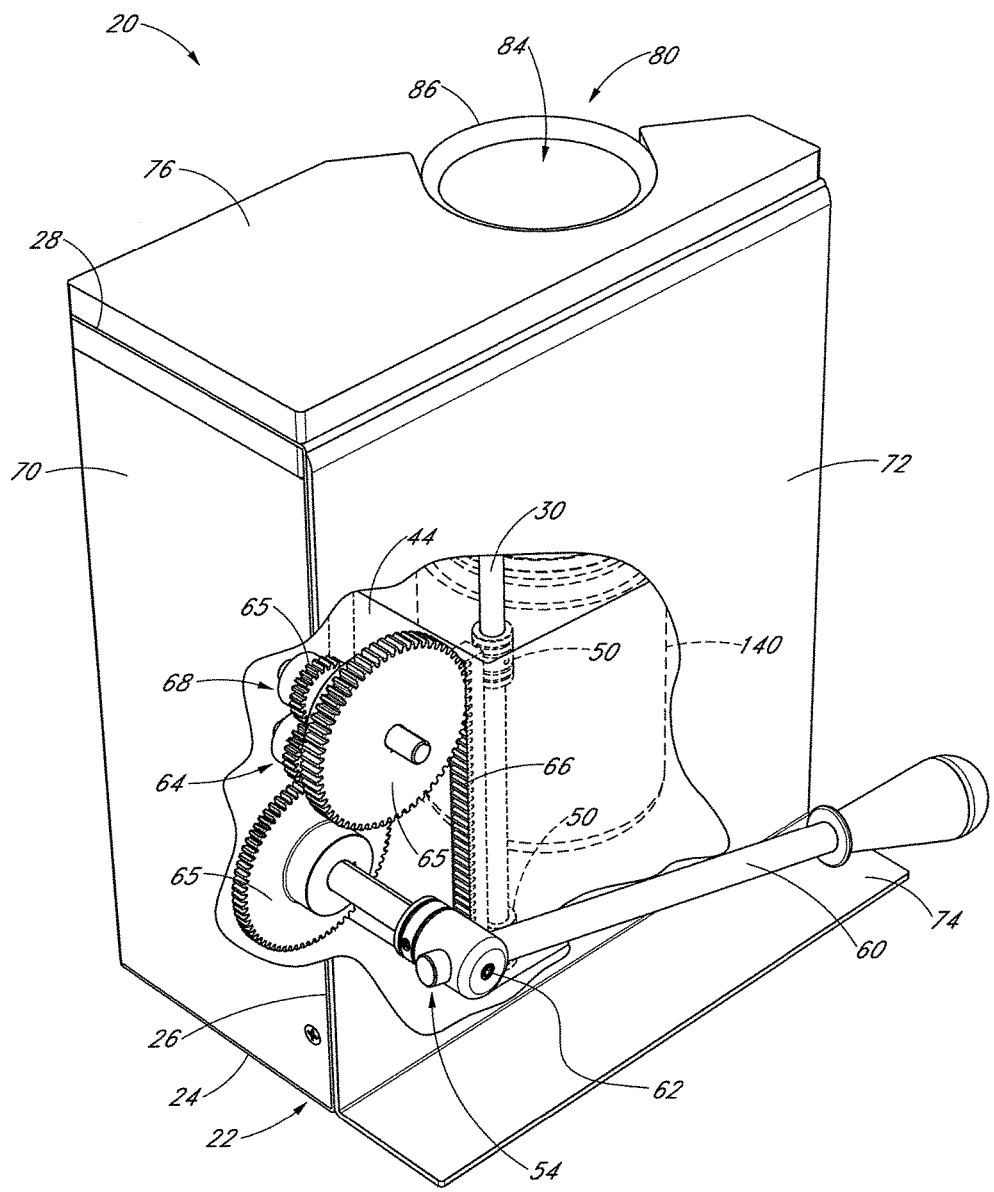
FIG. 5 is a partially cut away rear perspective view of the brewing device of FIG. 1.

As best shown in FIG. 5, a lift mechanism 54 preferably is provided to control movement of the lift 40 over the guide shafts 30. In the illustrated embodiment, the lift mechanism 54 comprises an elongated handle 60 having a handle base 62 that is rotatably supported by or at the side portion 26 of the frame 22. The handle base 62 is operably connected to a gear assembly 64 having a plurality of gears 65 so that when the handle 60 is rotated about the handle base 62, the gears 65 correspondingly rotate. A gear rack 66 is operably connected to the side part 44 of the lift 40 and in engagement with the gear assembly 64. As such, when the gear assembly 64 is actuated by rotation of the handle 60, the gear assembly 64 interacts with the gear rack 66 so that the lift 40 is selectively raised and lowered.

In the illustrated embodiment, the gear assembly 64 is disposed within a gear space 68. The gear space 68 preferably is enclosed within a cover 70. In the illustrated embodiment, a side cover 72 is attached to the frame side portion 26 and includes a side cover base 74 that extends outwardly from a bottom edge of the frame side portion 26.

Continuing with reference to FIGS. 1-5, an upper top member 76 preferably is placed above the top portion 28 of the frame 22 and a lower top member 78 preferably is placed immediately below the top portion 28 of the frame 22. The lower top member 78 can serve a decorative purpose and also can effectively limit travel of the lift 40 in an upward direction, as the lift upper part 46 may come into contact with the lower top member 78 to prevent further upward travel of the lift 40. In additional embodiments, restrictions of the range of travel of the lift 40 can be achieved using other structure, such as a limit to the gear rack 66 length, by placing stops on or adjacent the gear rack, or by placing stops and/or detents to limit rotational travel of the handle or vertical travel of the lift 40.

Figure 6:
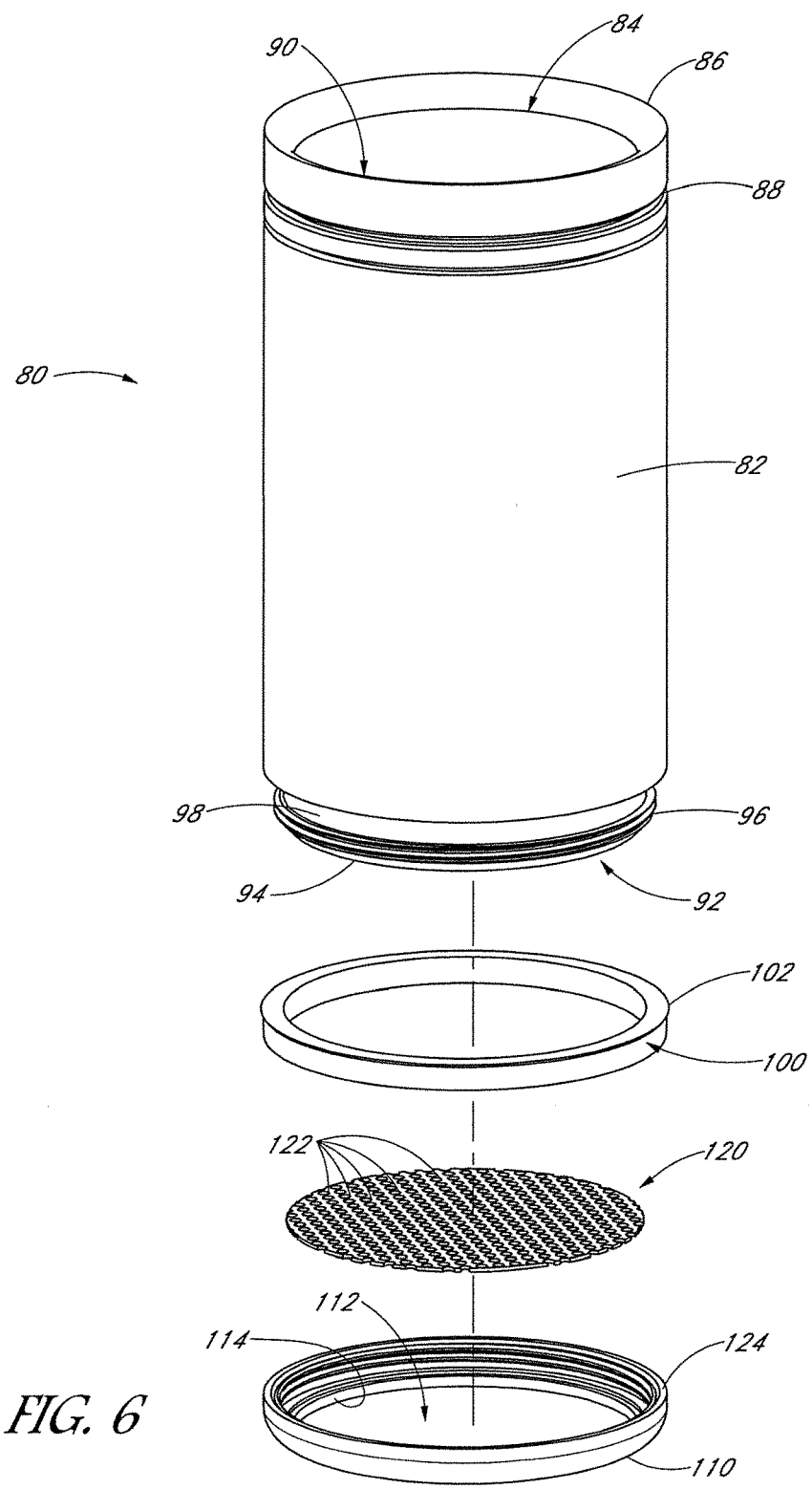
FIG. 6 is an exploded perspective view of a brewing canister configured in accordance with a preferred embodiment.
Figure 7:
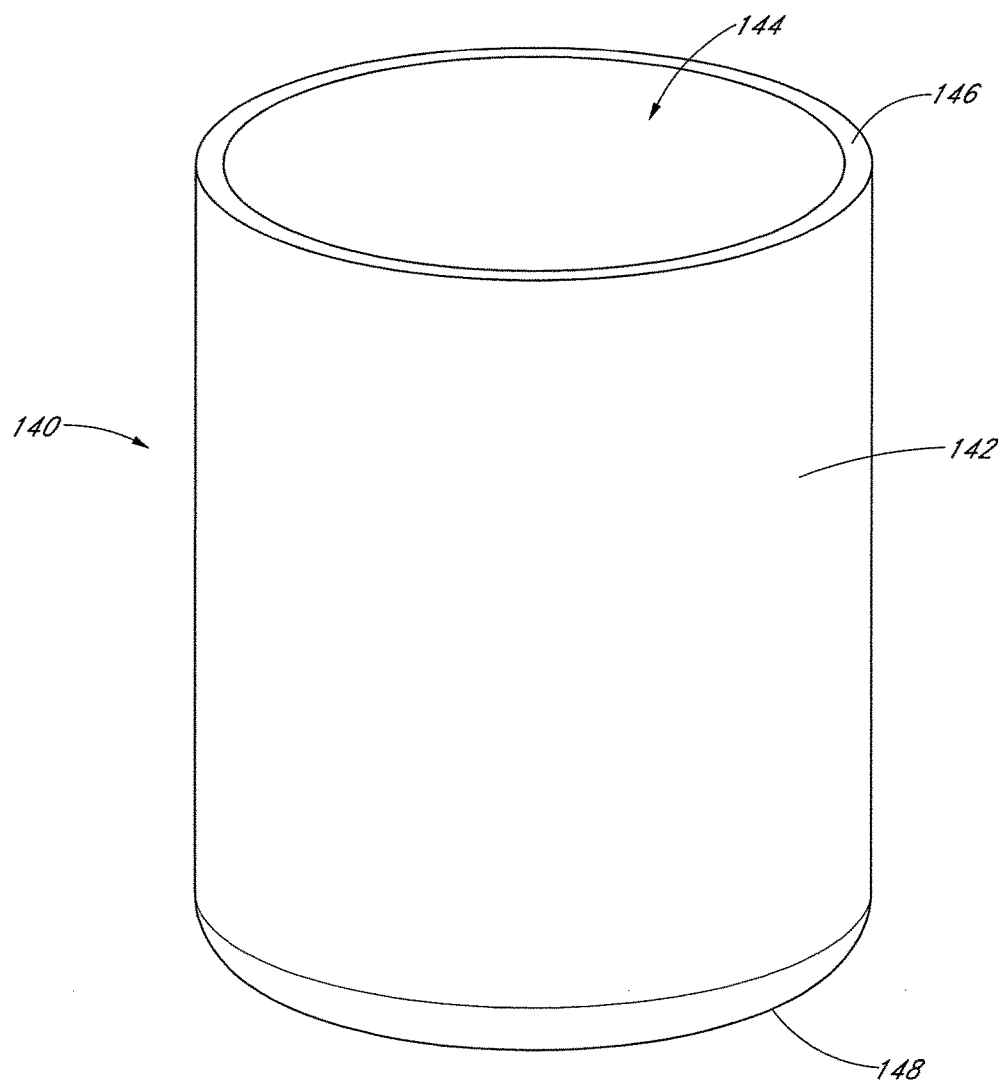
FIG. 7 is a perspective view of a receiving beaker configured in accordance with a preferred embodiment.

Continuing with reference to FIG. 1, and with additional reference to FIGS. 6 and 7, a brewing canister 80 is releasably supported by the frame 22, and a receiving beaker 140 is supported by the lift 40. The brewing canister 80 preferably is formed of a durable material, such as stainless steel, aluminum or polymer, and comprises an elongated cylindrical body 82 having an upper opening 84 adjacent its upper, or proximal, edge 86. Preferably, at least one circumferential mounting groove 88 is formed in the outer surface near the upper edge 86 of the brewing canister 80. A brewing chamber 90 is defined within the cylindrical brewing canister 80. A lower opening 92 is defined adjacent the brewing canister's lower, or distal, edge 94. The illustrated brewing canister 80 includes external threads 96 adjacent its lower edge 94, and an O-ring seat 98 is defined adjacent and proximal the threads 96. A sealing ring 100 made of rubber, silicone or any acceptable sealing material is configured to fit into and be retained in the O-ring seat 98. In the illustrated embodiment, a sealing lip 102 extends radially outwardly about the circumference of the sealing ring 100.

An internally threaded cap 110 is configured to be threadingly attachable to the external threads 96 of the brewing canister 80. The cap 110 defines a cap opening 112 and a filter seat 114 adjacent the cap opening 112. A filter 120 is sized and configured to complement the filter seat 114 so that the filter 120 seats securely in the filter seat 114, but is removable when the cap 110 is removed from the brewing canister 80. In the illustrated embodiment, the filter 120 is formed of a rigid or semi-rigid material, such as aluminum, stainless steel or plastic, and comprises a multitude of small perforations 122 sized to enable fluids, such as brewed coffee, to flow therethrough, but to prevent brewing media, such as coffee grounds, from flowing therethrough. Preferably, the filter 120 is reusable and easily cleanable. When the cap 110 is threaded onto the brewing canister 80, the filter 120 is securely sandwiched between the lower edge 94 of the brewing canister 80 and the filter seat 114 of the cap 110 (see also FIG. 8A). Also, in the illustrated embodiment, the cap 110 is sized so that a proximal edge 124 abuts the sealing member 100 when the cap 110 is fully threaded onto the brewing canister 80.

Figure 6A:
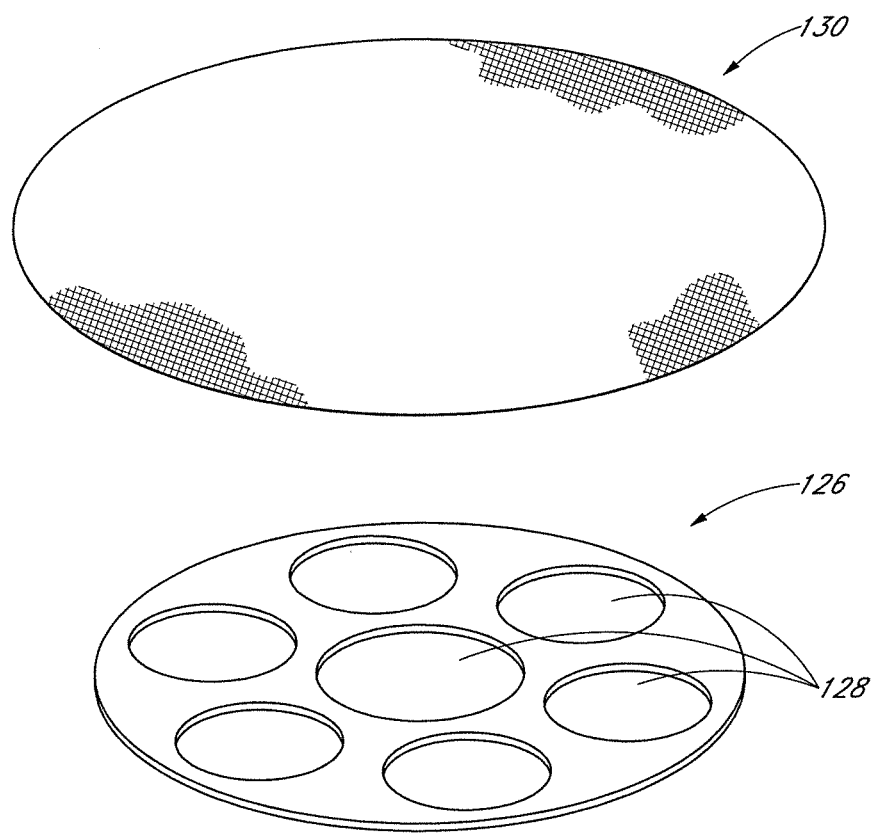
FIG. 6A is a perspective view of an embodiment of a filter support and a filter adapted for use with the brewing canister of FIG. 6.

With reference next to FIG. 6A, in another embodiment, in place of a rigid or semi-rigid filter, a filter support 126 may be sized and configured to fit in the filter seat 114 of the cap 110. The filter support 126 preferably is formed of a rigid material and has a plurality of apertures 128 formed therethrough. However, the apertures 128 can be relatively large compared to the perforations 122 of the filter 120. A compliant filter 130, such as a paper or textile filter, can be placed atop the filter support 126, which is disposed in the filter seat 114. The cap 110 may then be threaded onto the brewing canister 80. Preferably, the compliant filter 130 has a diameter somewhat larger than that of the filter support 126. As such, the compliant filter 120 extends between the threads of the cap 110 and the threads 96 of the brewing canister 80 so that the compliant filter 130 is securely held in place by the engaged threads. In this configuration, the filter support 126 supports the compliant filter 130 in an axial direction. Notably, the compliant filter 130 can be disposable. Also, although the illustrated compliant filter 130 is generally circular, other shapes, such as square, oval, or the like, can be employed. In yet additional embodiments, the compliant filter can have substantially the same diameter as the filter support so that it is sandwiched between the filter support and the canister lower edge when the cap is in place.

With particular reference next to FIG. 7, the receiving beaker 140 preferably also has a cylindrical body portion 142 and has an upper opening 144 defined adjacent its upper edge 146. However, the receiving beaker 140 preferably is closed at its bottom end 148, where a bottom wall 150 is defined. Preferably, the brewing canister 80 and receiving beaker 140 are sized so that the inner diameter of the receiving beaker 140 is slightly larger than the outer diameter of the brewing canister 80. As such, the brewing canister 80 can be inserted into and through the beaker opening 144 and into the beaker 140. Preferably, the brewing canister sealing ring 100 is sized and configured so that the sealing lip 102 engages an inner surface of the beaker 140, creating a seal therewith. In the illustrated embodiment, the brewing canister 80 is longer than the receiving beaker 140 so that when the brewing canister 80 is fully inserted into the receiving beaker 140, and the cap 110 engages the bottom wall 150 of the beaker 140, only a portion of the canister 80 is within the beaker (see FIG. 8A). Preferably the receiving beaker 140 is formed of a durable material such as stainless steel, aluminum or a polymer. In some embodiments the receiving beaker 140 is formed of a translucent or transparent material such as glass.

With reference again to FIGS. 1-3, a cavity 154 is formed in the frame top portion 28, and generally corresponding cavities 156 are formed in the lower top member 78 and upper top member 76. The cavity 154 defines an engagement edge 160 that is sized and shaped to complement the mounting groove 88 of the brewing canister 80. The engagement edge 160 has an arcuate portion 162 arranged between two entry portions 164. An axial width of the mounting groove 88 on the brewing canister 80 is slightly greater than a thickness of the engagement edge 160, and the depth of the mounting groove 88 is selected so that an outer radius of the brewing canister 80 at the bottom of the mounting groove 88 is less than a radius of the arcuate portion 162 of the engagement edge 160. Preferably, however, an outer radius of the brewing canister 80 adjacent the mounting groove 88 is greater than the radius of the arcuate portion 162. As such, the brewing canister 80 can be slid into the cavity 154 so that the engagement edge 160 fits within and engages the mounting groove 88 as shown in FIG. 1. In this manner, the brewing canister 80 is securely suspended from the frame top portion 28 in a manner that restricts both upward and downward movement of the canister 80 relative to the frame 22.

Figure 3:
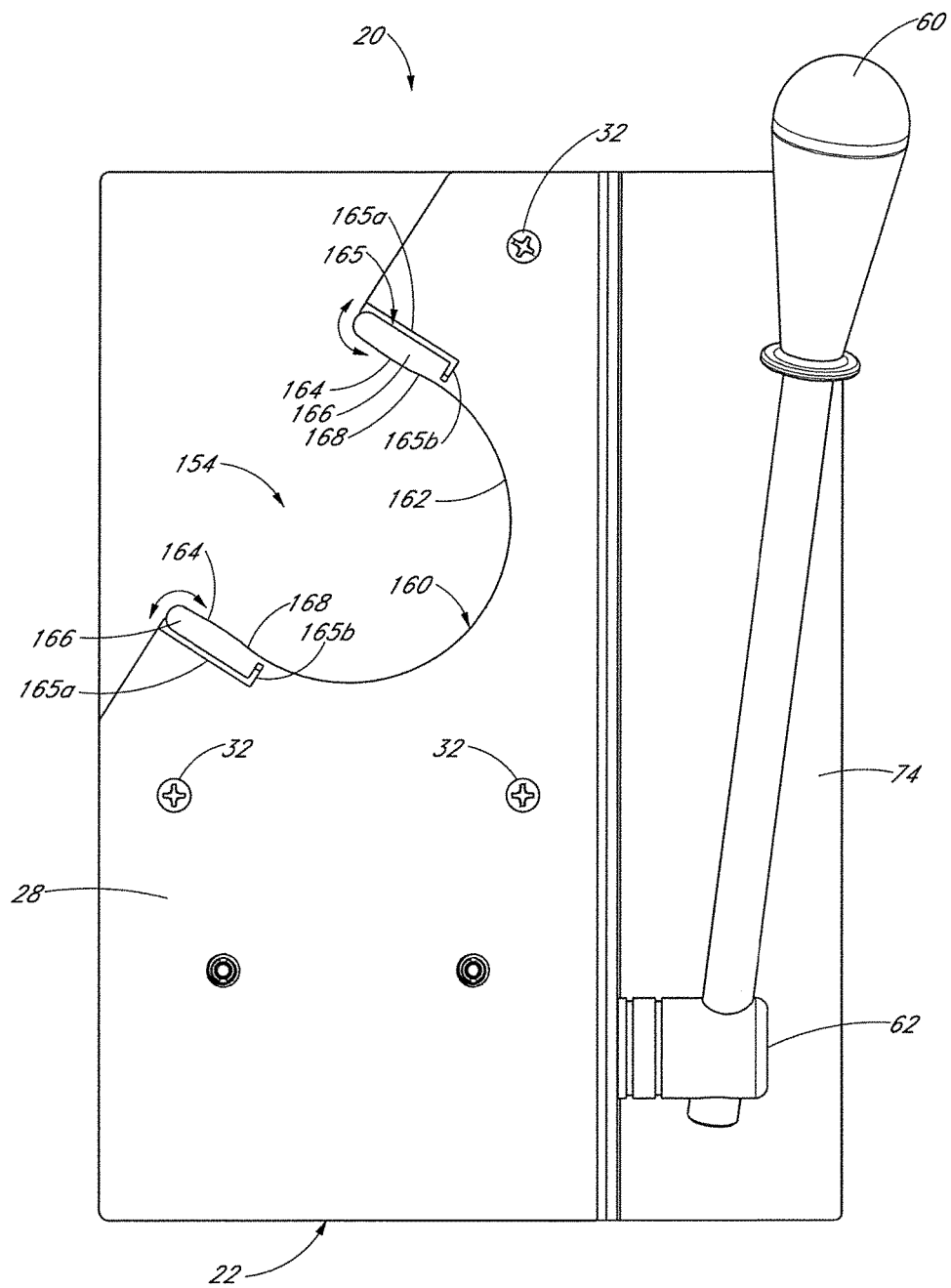
FIG. 3 shows a top view of the brewing device of FIG. 2.
Figure 4:
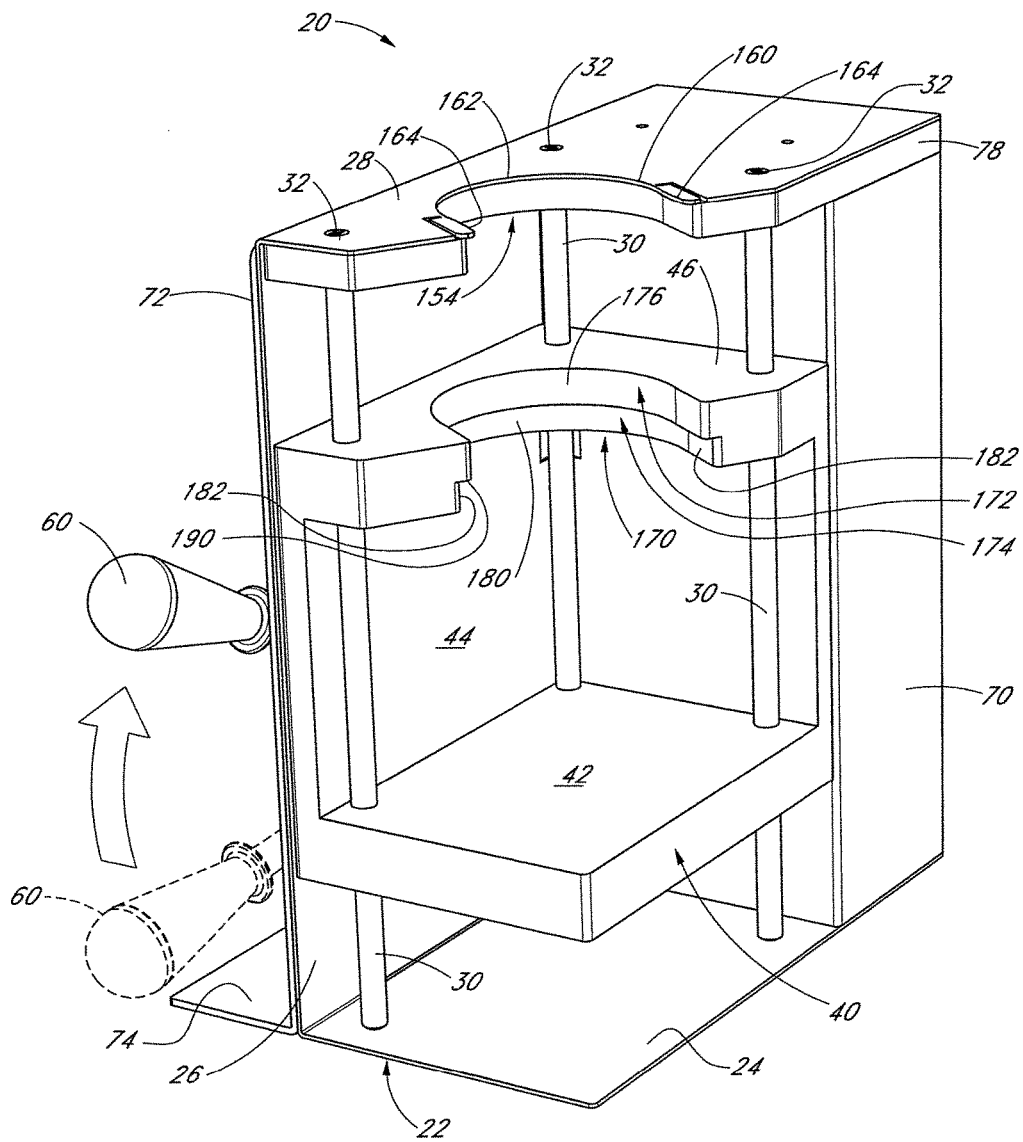
FIG. 4 shows the brewing device of FIG. 2 depicted between a loading position and an at-rest position.

With particular reference to FIG. 3, in the illustrated embodiment, a slot 165 extends inwardly and is spaced from each entry portion 164. A biased holder portion 166 is defined between each entry portion 164 and the associated slot 165. A first portion 165a of each slot 165 extends inwardly from a front edge of the frame top portion. A second portion 165b of each slot 165 extends generally toward the edge 160. In this configuration, the biased holder portion 166 is modestly rotatable relative to the rest of the frame top portion 28. Further, as shown, the arcuate portion 162 extends beyond 180°, including inwardly-directed portions 168 at and adjacent the second portions 165b of the slot 165. As such, when the frame is in an at-rest configuration, a distance between the entry portions 164 of the engagement edge 160 is less than the diameter of the arcuate portion 162, and also less than the diameter of the canister 80 at the bottom of the mounting groove 88. When the canister 80 is being installed into the cavity 154, the surface of the mounting groove 88 first engages the entry portions 164. As the canister 80 is pushed into the cavity 154, the biased holder portions 166 are urged outwardly by the surface of the mounting groove 88. Eventually, the mounting groove 88 becomes fully engaged with the arcuate portion 162, and the biased holder portions 166 return at least partially toward their at-rest positions. In this arrangement, the inwardly-directed portions 168 engage the surface of the mounting groove 88 and thus resist movement of the canister 80 in a direction out of the cavity 154. As such, once engaged with the frame top portion 28, the canister 80 is held securely in place.

Preferably, cavities 156 in the upper and lower top members 76, 78 have radii of curvature that are slightly greater, such as by about the same distance as the depth of the mounting groove 88, than the radius of the arcuate portion 162 of the engagement edge 160. As such, the upper and lower top members 76, 78 fit flush or nearly flush with the outer wall of the brewing canister 80. Also, preferably a distance between the mounting groove 88 and the upper edge 86 of the brewing canister 80 is about the same as the thickness of the upper top member 76 so that the upper edge 86 of the brewing canister 80 fits substantially flush with the upper surface of the upper top member 76 (see FIGS. 1, 5 and 8). Further, in some embodiments, the arcuate portion 162 curves about an axis of curvature that is aligned, or nearly aligned, with an axis of curvature of the brewing canister 80.

It is to be understood that, in other embodiments, a different structure can be employed to secure the brewing canister to the frame. Preferably, the brewing canister is attached to the frame in a manner so as to at least prevent the brewing canister from being pulled downwardly relative to the frame. Most preferably, however, the brewing canister is attached to the frame so that the brewing canister is restrained from moving up or down relative to the frame. In one example alternative embodiment, the frame can define a groove into which a ridge formed on the brewing canister can be slidingly fit so as to hold the brewing canister in place. Other embodiments may employ additional or alternative structures, such as a folding or locking member that secures the brewing canister in place.

Figure 2:
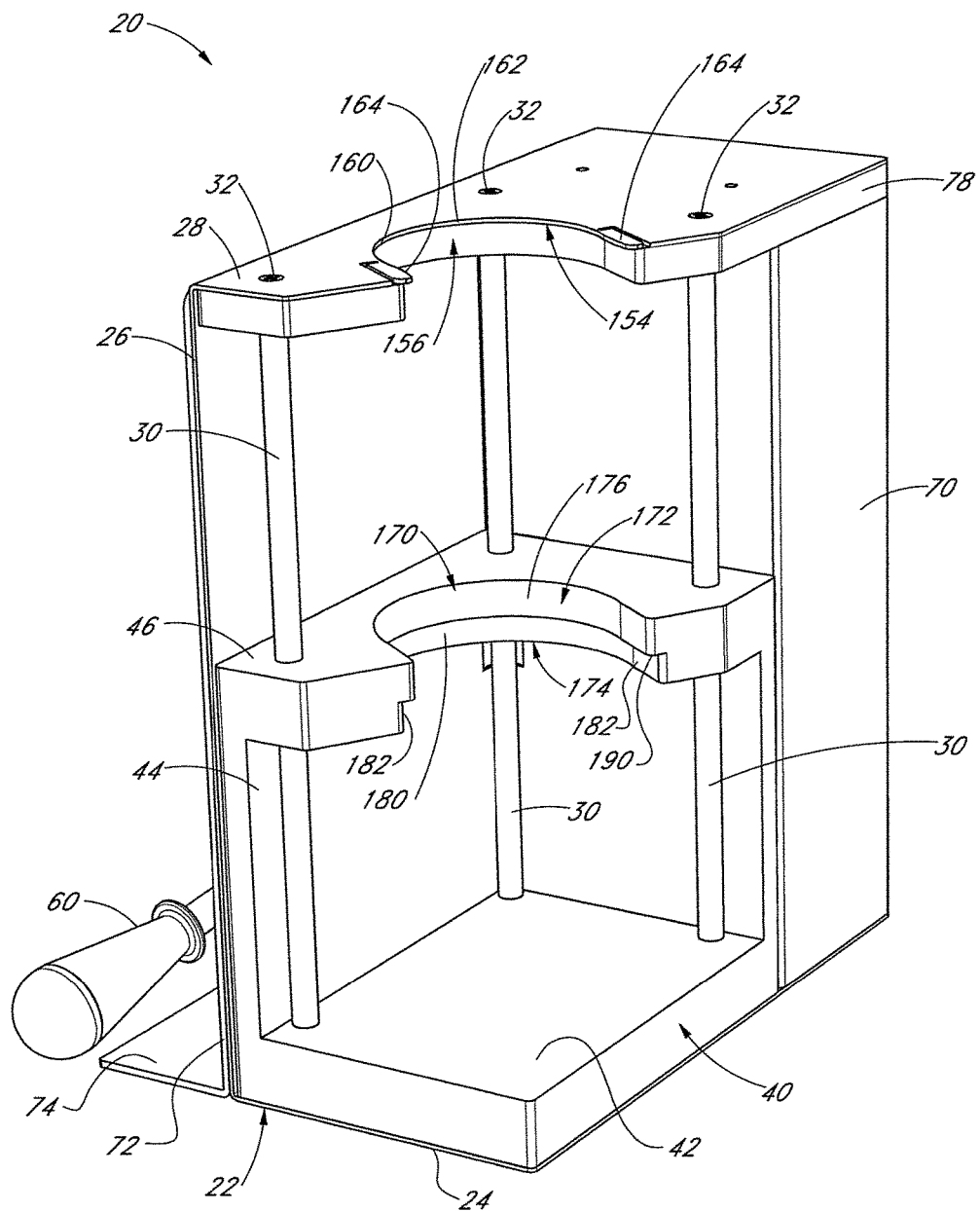
FIG. 2 is a perspective view of the brewing device of FIG. 1 with some features removed.

With continued reference to FIGS. 1 and 2, the receiving beaker 140 can be placed upon the lift bottom part 42 so as to be aligned with the brewing canister 80 that is suspended from the engagement edge 160. The lift upper part 46 includes a cavity 170 having an upper cavity part 172 and a lower cavity part 174. The upper cavity part 172 is configured to fit about the brewing canister 80, but spaced from the brewing canister, so that the lift 40 can move relative to the brewing canister 80 substantially without interference. Preferably the upper cavity part 172 includes an arcuate portion 176 that curves about a radius that is less than an outer radius of the receiving beaker 140 but, of course, greater than the outer radius of the brewing canister 80. Continuing with reference to FIGS. 1 and 2, the lower cavity part 174 preferably comprises an arcuate portion 180 arranged between two entry portions 182. The entry portions 182 are spaced apart from one another a distance approximating or exceeding an outer diameter of the receiving beaker 140, and the arcuate portion 180 is sized to have a radius approximating or exceeding an outer radius of the receiving beaker 140. As such, the receiving beaker 140 can be can be slid into the lower cavity 174.

An engagement surface 190 is defined between the upper cavity 172 and the lower cavity 174. In the illustrated embodiment, the engagement surface 190 is generally horizontal. The engagement surface 190 is configured to engage the upper edge 146 of the receiving beaker 140 so that the receiving beaker 140 may not move upwardly past the engagement surface 190. As shown, preferably a distance between the lift bottom part 42 and the engagement surface 190 generally approximates a length of the receiving beaker 140 from the receiving beaker upper edge 146 to its bottom end 148. In some embodiments, a distance from the lift bottom part 42 to the engagement surface 190 may exceed the length of the receiving beaker, but preferably only by a minimal distance such as, for example, less than 5% or more preferably less than 3%, or even more preferably less than 2% of the length of the receiving beaker.

In the illustrated embodiment, the lower cavity 174 is shaped to somewhat approximate the shape of the receiving beaker 140 so as to assist in aligning the receiving beaker 140 with the brewing canister 80. Some embodiments are configured so that when the brewing canister 80 is engaged in the frame's engagement edge 160 and the receiving beaker 140 is arranged on the lift 40 and in the lower cavity 174, the axis of the receiving beaker 140 is substantially aligned with the axis of the brewing canister 80. Other embodiments may not employ much precision, and may rely upon a user aligning the brewing canister 80 and receiving beaker 140. In still further embodiments, the upper opening 144 of the receiving beaker 140 may be somewhat enlarged, and then may taper moving downwardly to the desired inner radius so that if the brewing canister is somewhat misaligned with the receiving beaker initially, the beaker will still receive the canister through the upper opening, and then as the beaker moves up over the canister, contact with the bottom end of the canister will urge the beaker to move into proper alignment. In some embodiments, the lift bottom part 42 may have a guide formed therein. Such a guide preferably would be sized complementarily to the bottom end 148 of the receiving beaker 140 and would be configured so that the receiving beaker 140 can be placed in the guide and slid into place in the lower cavity 174 with desired alignment with the brewing canister 80.

Figure 8:
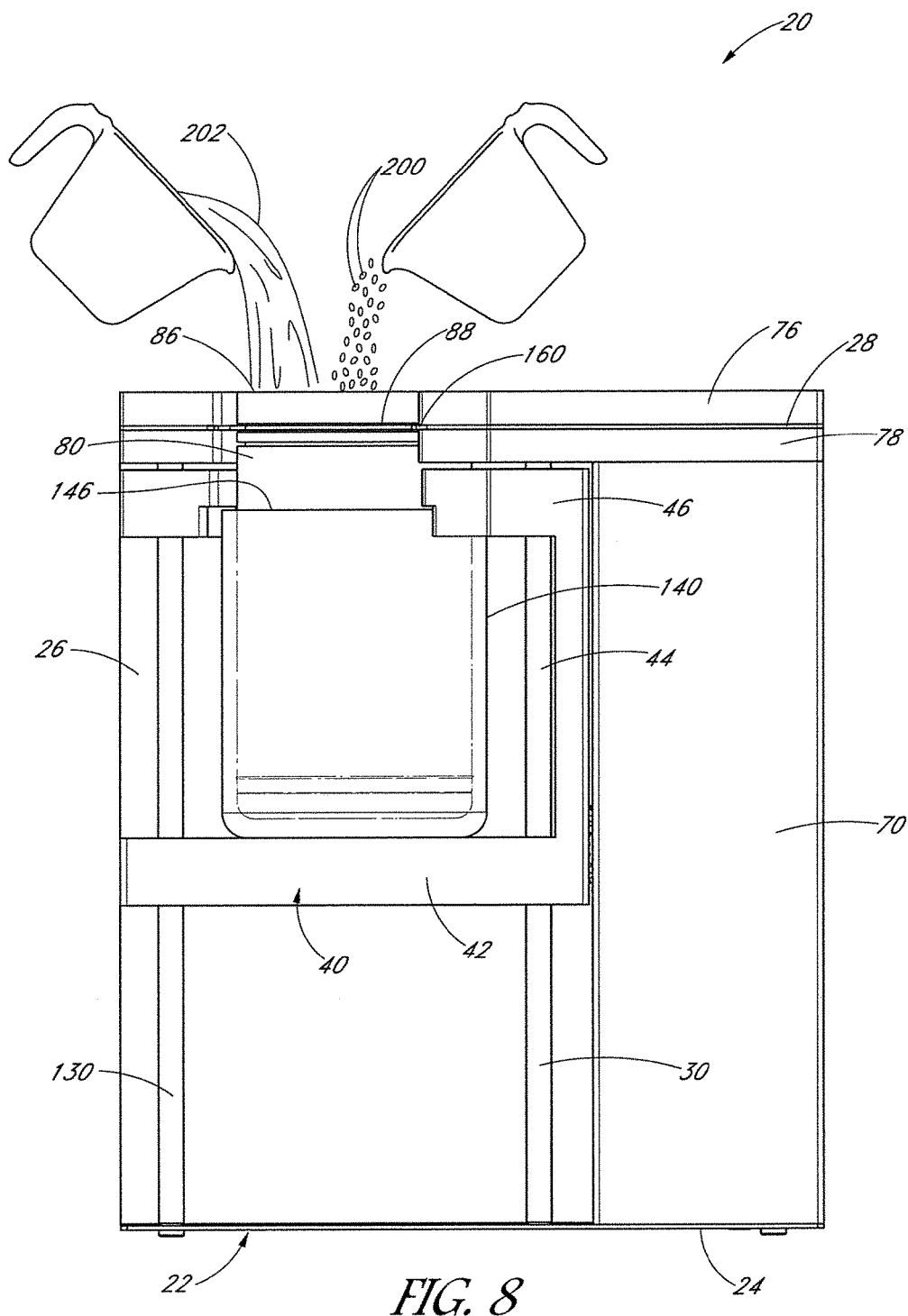
FIG. 8 is a side view of the brewing device of FIG. 1 depicted in the loading position.

FIG. 1 shows the brewing device 20 in an at-rest position, in which the brewing canister 80 is above but not engaged with or partially within the receiving beaker 140. From this position, when the handle 60 is rotated upwardly, the lift 40 will be moved upwardly or proximally, and correspondingly the receiving beaker 140 will be moved upwardly and over a portion of the brewing canister 80 to an upper or loading position as depicted in FIG. 8. Preferably, both the brewing canister 80 and the receiving beaker 140 are empty when being moved into the loading position. In some embodiments, the engagement of the brewing canister sealing lip 102 with the inner surface of the receiving beaker 140 will provide enough friction to maintain the brewing device 20 in the upper position. Additional embodiments may employ a detent and/or a braking device that prevents the brewing device 20 from automatically reverting to the at rest position. For example, in one embodiment a spring-and-ball detent in the lift side part 44 can releasably engage an aperture in the frame side portion 26 to help hold the lift in the upper position. Of course, other structure and configurations can be employed as desired.

Figure 8A:
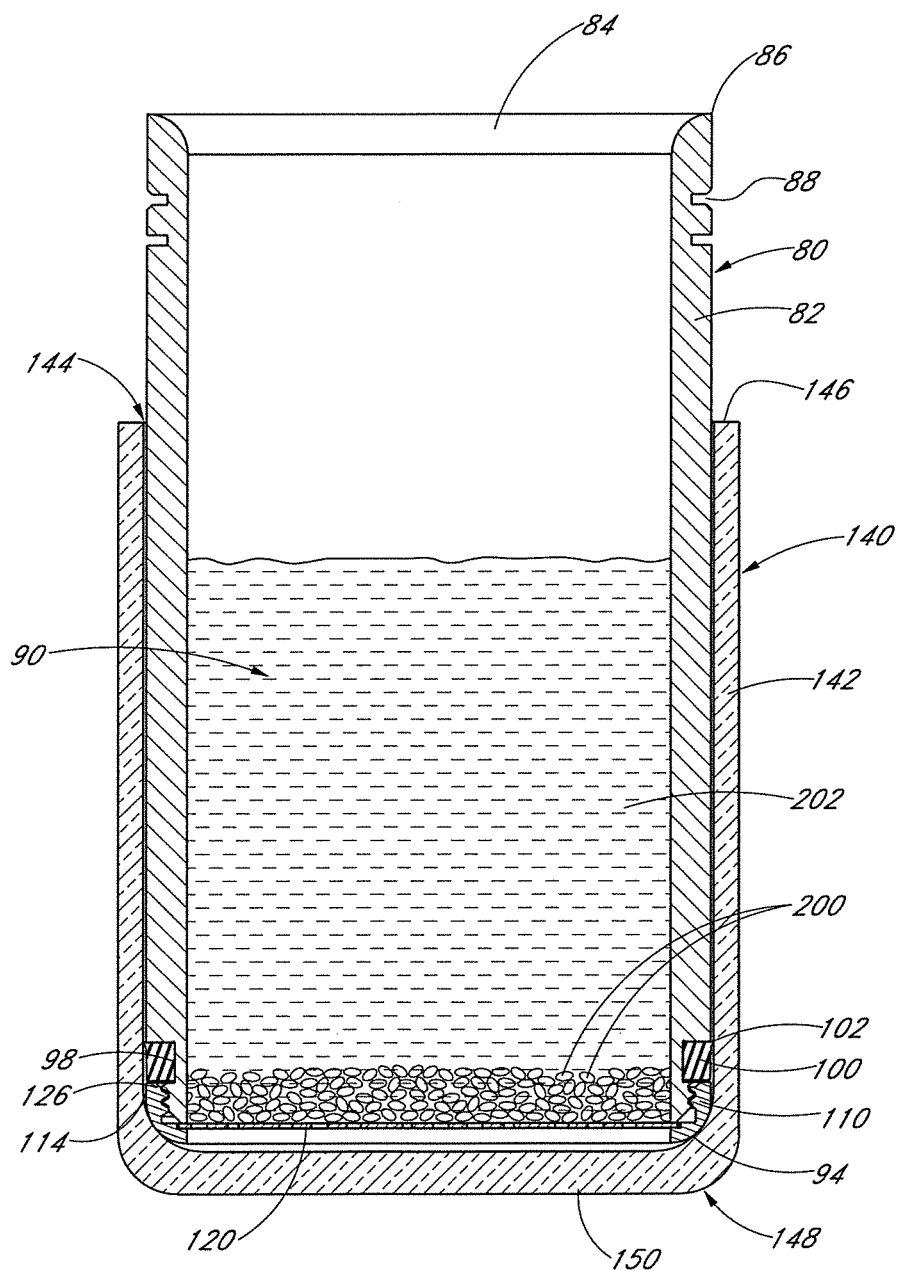
FIG. 8A is a cross-sectional view of the brewing canister and receiving beaker when positioned as depicted in FIG. 8.

With particular reference to FIGS. 8 and 8A, when the brewing device 20 is in the upper or loading position, the lift 40 is essentially all the way up in its range of travel so that the canister 80 is received within the beaker 140. In the illustrated embodiment, further upward travel is limited by the brewing canister cap 110 engaging the bottom wall 150 of the receiving beaker 140. In other embodiments, upward travel may be limited by other structure, such as the lift upper part 46 engaging the lower top member 78 and/or engagement of a detent.

As shown in FIG. 8, when in the upper or loading position, brewing media 200 such as coffee grounds can be poured into the brewing canister 80, and brewing fluid 202 such as hot water can also be added. In some embodiments, a mixing rod may be employed to mix the brewing media 200 with the fluid 202. With the brewing fluid 202 mixed with the brewing media, the brewing process proceeds, with the fluid 202 absorbing flavor and the like from the brewing media 200. The brewing device 20 may be left in the upper position as long as desired to permit the brewing process to proceed. As best shown in FIG. 8A, the filter 120 prevents the brewing media 200 from flowing downwardly, and all or most of the water 202 is maintained within the brewing chamber 90 defined in the brewing canister 80.

Figure 9:
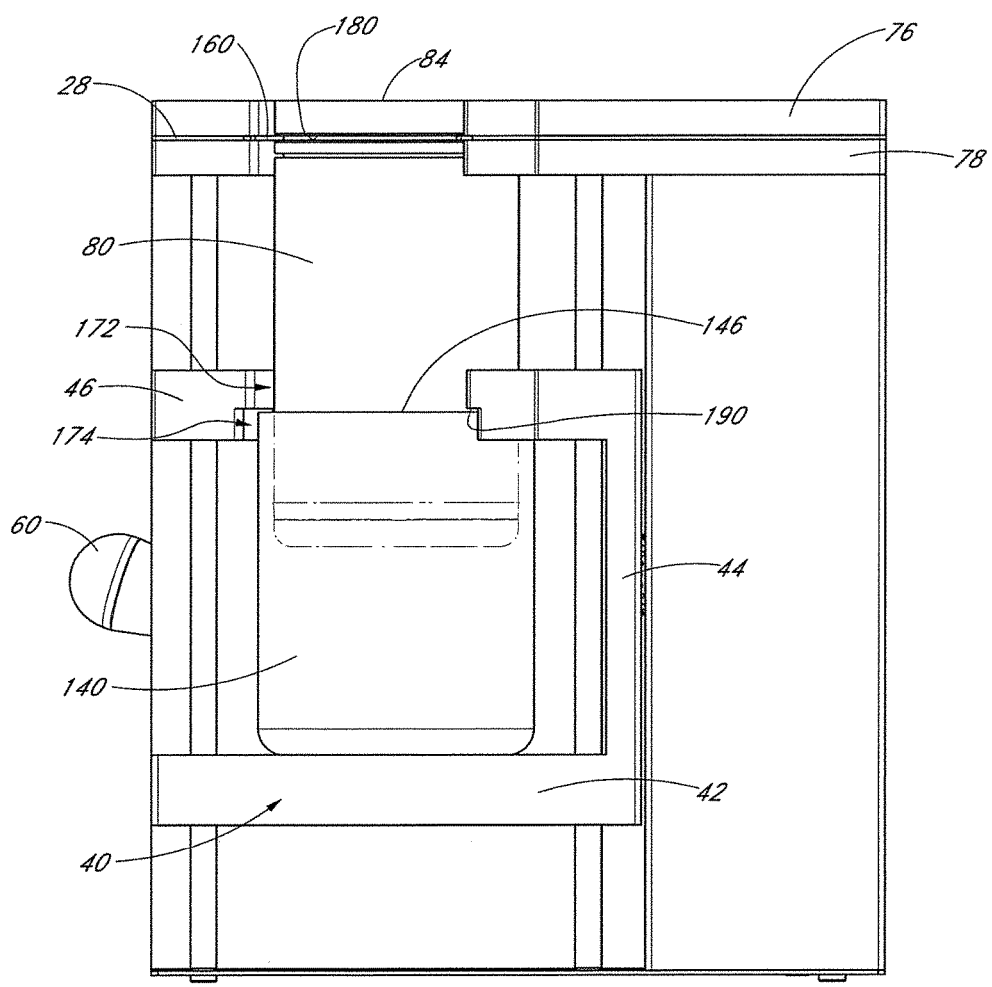
FIG. 9 is a side view of the brewing device of FIG. 1 depicted in a middle position.
Figure 9A:
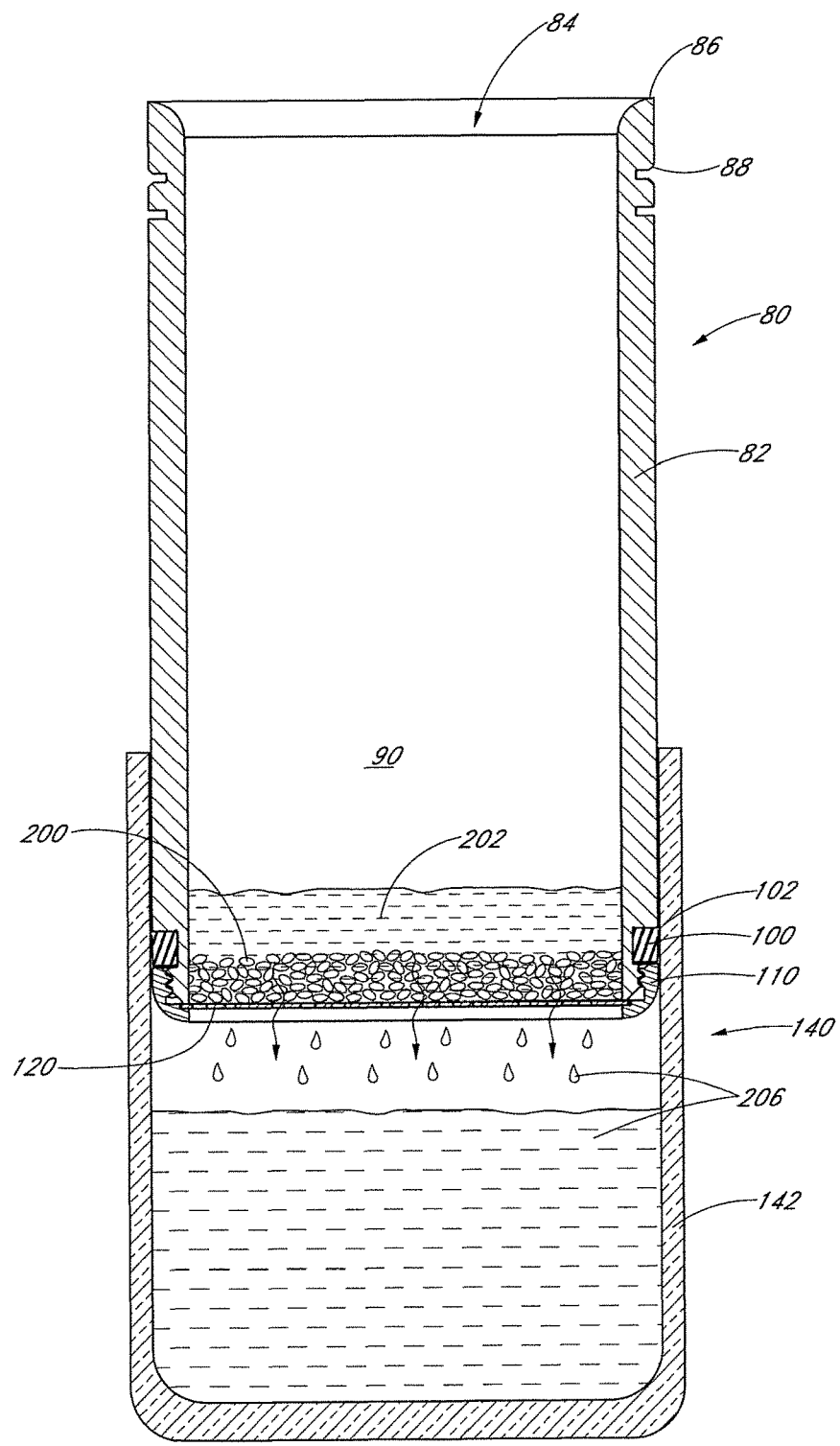
FIG. 9A is a cross-sectional view of the brewing canister and receiving beaker when positioned as depicted in FIG. 9.

With reference next to FIGS. 9 and 9A, after the water and brewing media have been permitted to brew for a desired time, the user begins to rotate the handle 60 downwardly. In some embodiments, the user may disengage a brake or detent before or upon rotating the handle 60 downwardly. As such, the engagement surface 190 of the lift 40 engages the upper edge 146 of the receiving beaker 140, urging the beaker 140 downwardly relative to the brewing canister 80. Since the sealing lip 102 of the brewing canister is sealingly engaged with the inner surface of the beaker 140, a vacuum is generated within the beaker 140. Due to the vacuum, fluid 202 within the brewing chamber 90 is drawn through the brewing media 200 and the filter 120 and into the beaker 140. During its time mixed with the brewing media 200 in the brewing chamber 90, and as it is drawn through the brewing media 200, the fluid 202 becomes a brewed fluid 206 such as a brewed coffee. The brewed fluid 206 flows into the beaker 140, while the brewing media 200 is retained in the brewing canister 80. As the handle 60 continues to be rotated downwardly, the vacuum continues to be generated, so that most or all of the brewed fluid 206 is drawn from the brewing chamber 90 through the brewing media 200 and the filter 120 and into the beaker 140.

Figure 10:
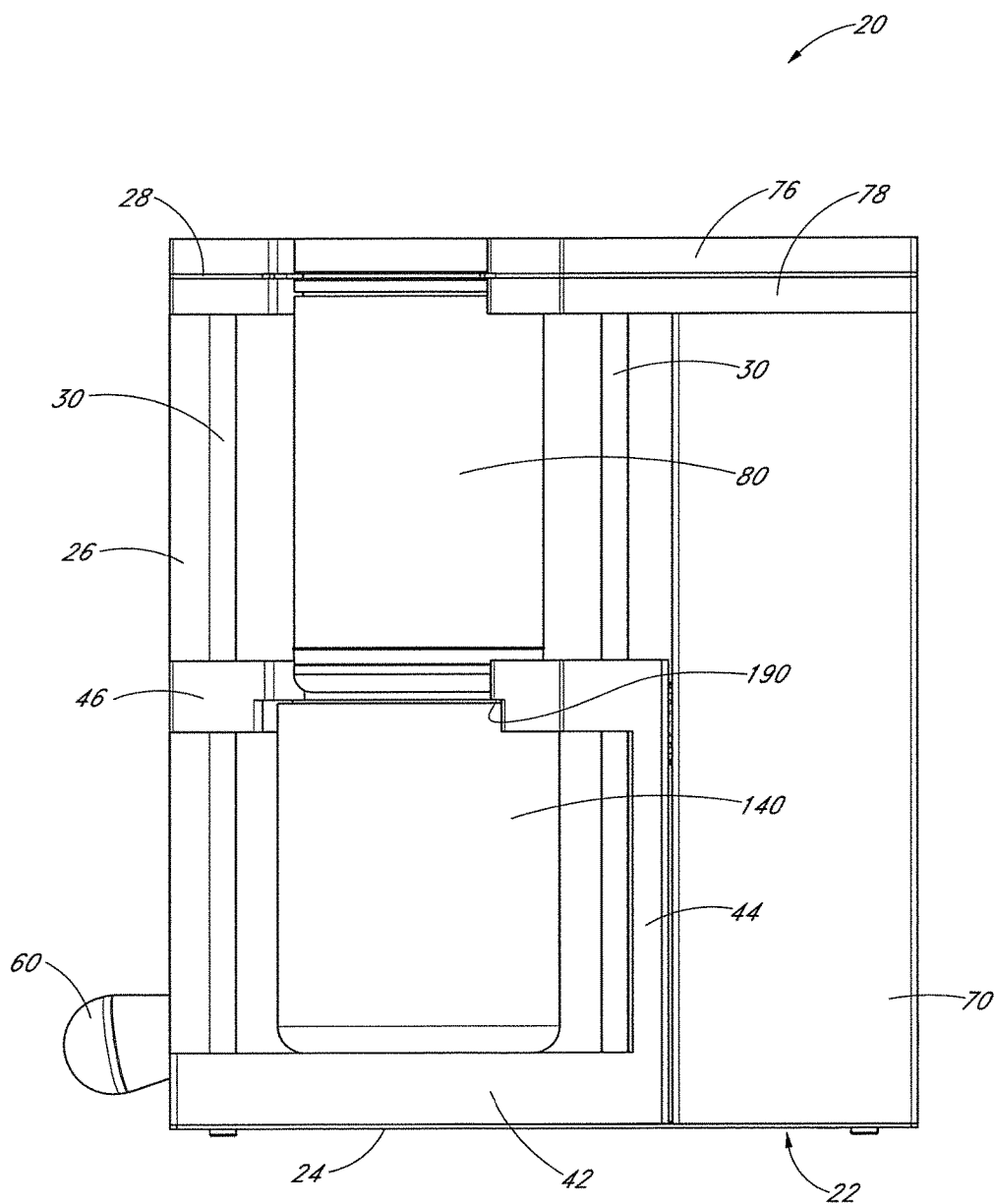
FIG. 10 is a side view of the brewing device of FIG. 1 depicted in an at-rest position.
Figure 10A:
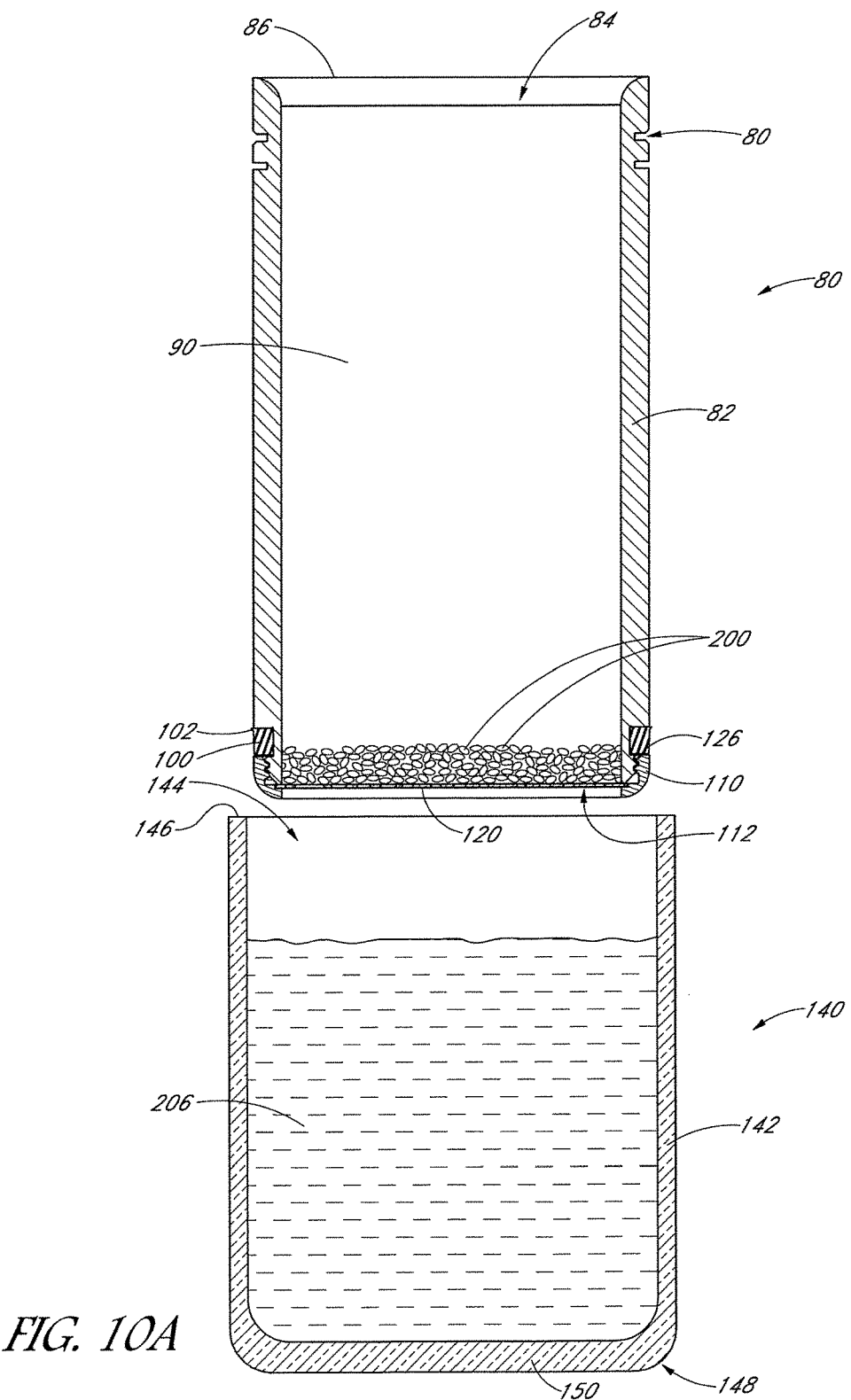
FIG. 10A is a cross-sectional view of the brewing canister and receiving beaker when positioned as depicted in FIG. 10.

With reference next to FIGS. 10 and 10A, after all of the water has been drawn from the brewing chamber 90 through the brewing media 200 and into the receiving beaker 140, the handle 60 is further rotated downward to draw the brewing canister 80 completely out of the beaker 140. As the sealing lip 102 exits the beaker 140, the vacuum is defeated, and no longer draws any residual moisture from within the brewing chamber 90 downward through the filter 120. Also, the lift 40 is moved to the at-rest position, from which the beaker 140 can be removed from the device 20, and the brewed fluid 206 can be dispensed into a cup, pitcher, or the like.

In some embodiments, a detent or brake is actuated immediately before the lift 40 is moved downwardly enough to break the seal. As such, the brewing canister 80 and beaker 140 may be maintained in a position where the vacuum still draws water through the brewing media before the vacuum is defeated. This can also protect against unintentional or premature breaking of the vacuum seal. Once the user is satisfied that sufficient fluid has been brewed, the detent or brake may be disengaged so as to break the seal and move the lift 40 to the at-rest position.

Figure 11A:
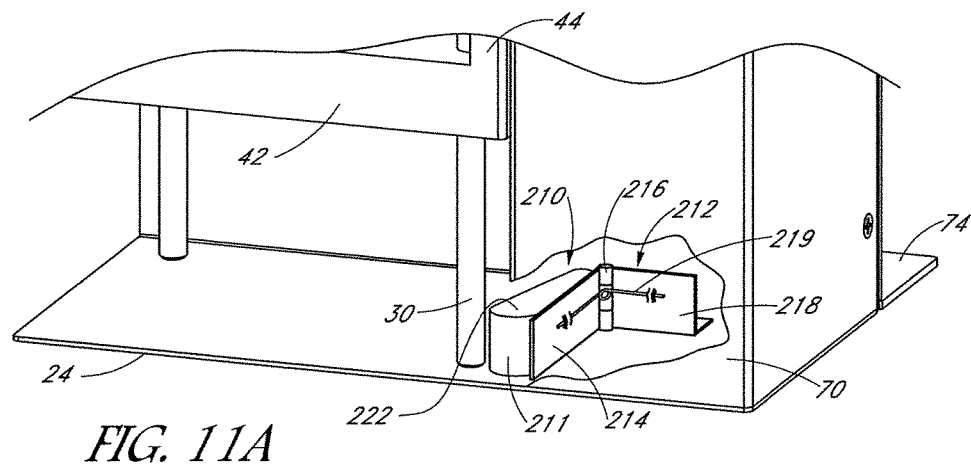
FIG. 11A is a partial view of another embodiment of a brewing device showing a detent mechanism.
Figure 11B:
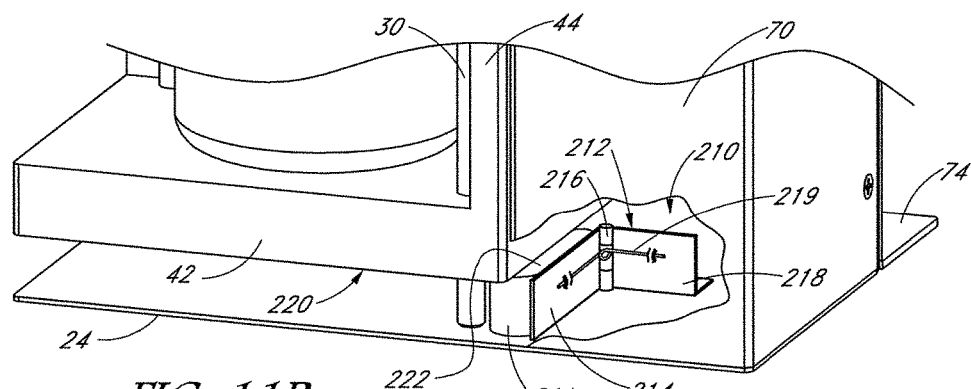
FIG. 11B shows the embodiment of FIG. 11A with a lift of the brewing device engaged with a block of the detent mechanism.
Figure 11C:
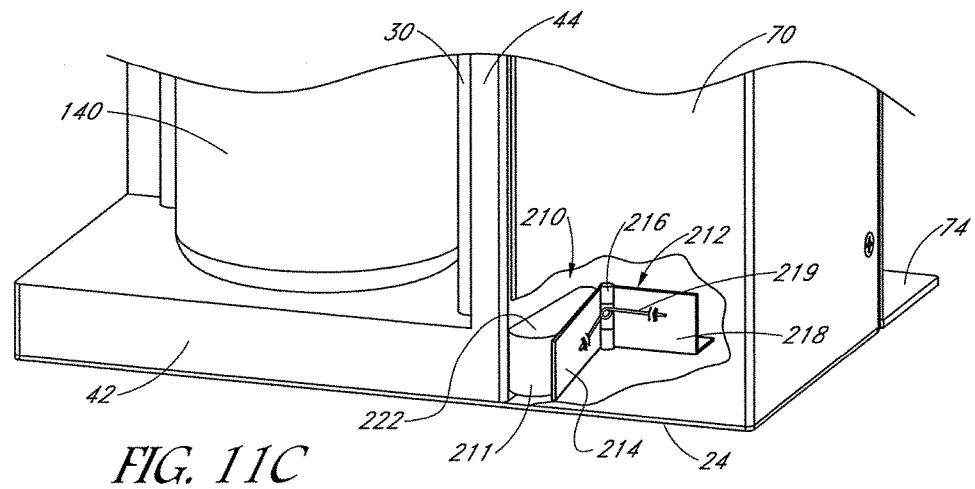
FIG. 11C shows the embodiment of FIGS. 11A-B with the detent mechanism defeated and the lift in the at rest position.

With reference next to FIGS. 11A-C, one embodiment of a detent mechanism 210 is configured to temporarily stop the withdrawal of the brewing canister 80 from the beaker 140 before the vacuum is defeated. In the illustrated embodiment, a block 211 is connected to a biasing mechanism 212 so that the block 211 is biased to extend into the space in which the lift 40 travels. In the illustrated embodiment, the block 211 is attached to a plate 214 that is attached, via a hinge 216, to a mount 218. A spring 219 operating between the mount 218 and plate 216 biases the block 211 to rotate outwardly, into the space in which the lift 40 travels. Thus, as shown in FIG. 11A, when the lift 40 is moved upwardly, the block 211 extends into the space and below the lift bottom part 42. As the lift 40 is lowered, drawing the brewed fluid into the beaker 140, eventually a bottom surface 220 of the lift 40 engages a top surface 222 of the block 211, as depicted in FIG. 11B, thus stopping further downward movement of the beaker 140 relative to the brewing canister 80. Preferably, the block 211 is sized so that relative movement is stopped before the seal is broken. Once a user is satisfied that the brewed fluid has been sufficiently removed from the brewing canister 80, the user pushes the block 211 out of the way so as to release the detent and enable the lift 40 to be moved further downward to the at-rest position, as depicted in FIG. 11C. In this embodiment, the detent mechanism 210 prevents inadvertent defeat of the vacuum. It is to be understood that the illustrated detent is provided for example only, and detent mechanisms having differing structure, and placed at different locations, may be employed.

Figure 12A:
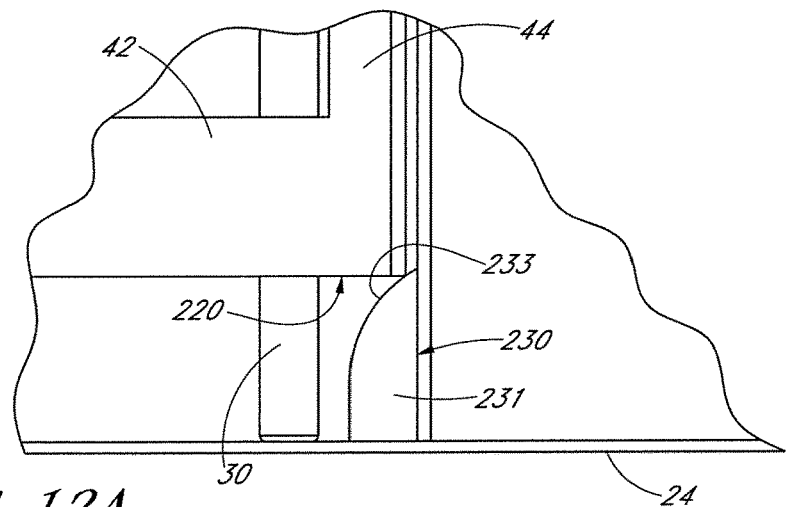
FIG. 12A is a partial view of another embodiment of a brewing device showing a brake mechanism, with a lift of the brewing device initiating contact with a block of the brake mechanism.
Figure 12B:
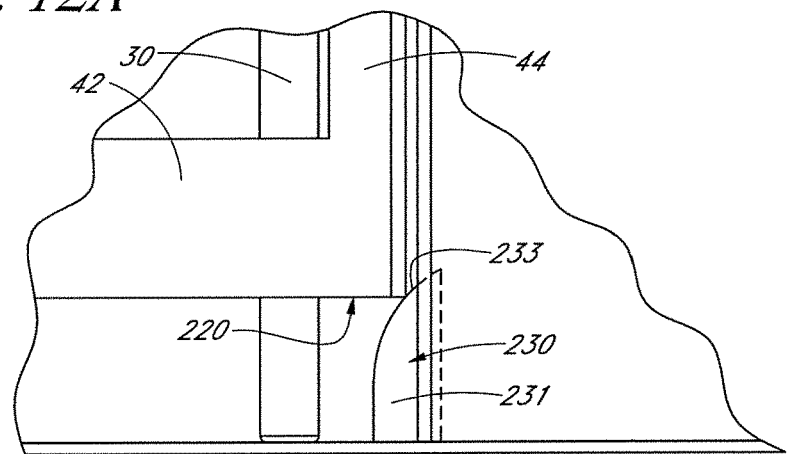
FIG. 12B shows the embodiment of FIG. 12A with the lift pushing the brake mechanism to the side.
Figure 12C:
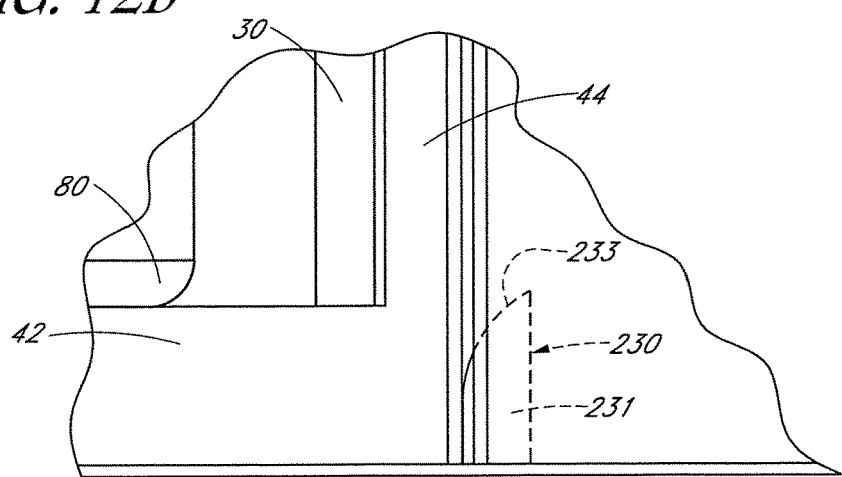
FIG. 12C shows the embodiment of FIGS. 12A-B with the brake mechanism defeated and the lift in the at rest position.

With reference to FIGS. 12A-C, in another embodiment, a detent mechanism comprises a brake 230 that also comprises a block 231 that is biased into the space in which the lift 40 travels. In the illustrated embodiment, the block 231 has an upper cam surface 233 that is angled and/or arcuate relative to the direction of travel of the lift 40. Preferably, however, the cam surface 233 is such that when the lift 40 is moved downwardly so that the bottom surface 220 first engages the cam surface 233, as depicted in FIG. 12A, continued downward movement of the lift 40 preferably is stopped, or at least substantially resisted. Preferably, at this position, the vacuum seal has not yet been broken. Once the user is satisfied that the brewed fluid has been sufficiently removed from the brewing canister 80, the user increases the force applied to the handle 60 so that the lift bottom surface 220 in turn applies greater pressure to the cam surface 233, overcoming the biasing force and urging the block 231 out of the way of the lift 40, as depicted in FIG. 12B, until the block 231 is completely pushed out of the way, as depicted in FIG. 12C, so that the lift 40 can be moved completely downward to the at-rest position. In this manner, the brake temporarily stops movement of the beaker 140 relative to the canister 80 just before the vacuum seal is broken, but the brake can be overcome by the user simply by increasing the force urging the lift 40 downward. It is to be understood that the illustrated brake 230 is provided for example only, and brakes having differing structure, and placed at different locations, may be employed.

In yet another embodiment, a brake can be positioned relative to the lift 40 so that the brake engages just after the seal between the brewing canister 80 and the receiving beaker 140 breaks. During movement of the lift when the seal is engaged, the seal provides resistance to such movement. Preferably, the brake is configured to at least partially replace the resistance previously provided by the engaged seal. It is to be understood that, in some embodiments, multiple brakes may be used, placed at different locations. For example a first brake or detent can be placed to stop relative movement prior to breaking of the seal, and a second brake can be placed to engage after breaking of the seal to partially replace resistance forces previously provided by the seal. The first brake can provide a greater resistance force than the second brake.

After use, not only is the receiving beaker 140 removed to dispense the brewed fluid 206, but the brewing canister 80 can also be removed and easily disassembled for cleaning. In yet additional embodiments, the filter, or filter support, can be unitarily formed as part of the brewing canister 80 so that the brewing canister and filter/filter support are formed as a single piece.

The illustrated embodiment has employed a particular structure for moving the receiving beaker 140 relative to the brewing canister 80 so as to create a vacuum that draws water 202 from the brewing chamber 90 through the brewing media 202 and filter 120. It is to be understood that other specific structures can be employed while still practicing the inventive principles discussed herein. Additionally, the gear-based lift mechanism 54 in the illustrated embodiment is provided for example only. It is to be understood that other configurations and types of lift mechanisms 54 can be employed. For example in another embodiment, an electric motor, such as a stepper motor, or a hydraulic motor combined with a linkage or other structure, can be employed to move the receiving beaker 140 relative to the brewing canister 80. Further, electronic controls can be provided in some embodiments for controlling such an electric motor so as to optimize vacuum forces and/or brewing times. For example, in one embodiment, an electric stepper motor will provide feedback to a controller so that the controller can monitor or predict vacuum forces being generated and adjust electric motor control accordingly, such as to keep the vacuum forces within a desired range. In some such embodiments using such feedback, the controller may determine when substantially all of the water has been drawn through the brewing media and thus can determine the correct or optimal time to progress all the way to the at rest position. In still further embodiments the controller can automatically control parameters such as brewing time and the like.

In still further embodiments, the brewing device 20 can be combined with a hot water source that may be called upon to manually or automatically provide water to the brewing canister 80 or, in another embodiment, may be computer controlled to supply a metered volume of water. Similarly, the brewing device 20 can be combined with a hopper comprising types of brewing media, such as one or multiple types of coffee beans, which can be automatically dispensed in metered amounts into the brewing canister 80. In such embodiments, an electronic controller may be programmed to control the process so as to optimize portions of brewing media and water, water temperature, brewing time, movement of the lift, and the like as desired for each particular type of brewing media such as for particular types of coffee beans, grind sizes or the like.

The embodiments discussed above have disclosed structures with substantial specificity. This has provided a good context for disclosing and discussing inventive subject matter. However, it is to be understood that other embodiments may employ different specific structural shapes and interactions. For instance, another embodiment can employ principles as discussed above; but may be configured so that the receiving beaker is held still, while the brewing canister is pulled out of the receiving beaker so as to generate the vacuum.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above, but should be determined only by a fair reading of the claims that follow.

What is claimed is:

1. A brewing device, comprising:
   a frame having a first holder;
   a lift that is movable relative to the frame, the lift having a second holder;
   a brewing canister configured to be supported by one of the first and second holders, the brewing canister having an outer diameter and having a filter, a brewing chamber defined within the brewing canister above the filter;
   a receiving beaker configured to be supported by the other of the first and second holders, the receiving beaker having an inner diameter that is greater than the outer diameter of the brewing canister;
   the brewing canister and receiving beaker configured so that the brewing canister can be inserted into the receiving beaker so that the filter of the brewing canister is within the receiving beaker, and an upper portion of the brewing canister is not within the receiving beaker;
   a sealing member configured to establish a seal between the brewing canister and the receiving beaker when the brewing canister is inserted into the receiving beaker; and
   the brewing chamber configured to receive a fluid and a brewing media therewithin so as to brew a brewed fluid therefrom;
   wherein when the lift is moved relative to the frame, the receiving beaker is moved vertically relative to the brewing canister between a first position, in which the brewing canister is inserted into the receiving beaker and a second position, in which the brewing canister is completely removed from the receiving beaker.

2. A brewing device as in claim 1, wherein when the receiving beaker is in the first position and fluid and brewing media are disposed in the brewing chamber, moving the lift so that the receiving beaker is moved toward the second position will create a vacuum between the filter and the receiving beaker, and wherein the vacuum will draw brewed fluid from the brewing chamber through the filter and into the receiving beaker.

3. A brewing device as in claim 2 additionally comprising a detent mechanism configured to temporarily stop movement of the lift toward the second position, the detent mechanism configured to stop movement of the lift at a third position between the first and second positions, wherein the seal between the receiving beaker and the brewing canister is still established when the lift is at the third position.

4. A brewing device as in claim 2, wherein when the receiving beaker is in the second position, the receiving beaker can be removed from the respective first or second holder independently from the brewing canister.

5. A brewing device as in claim 4, wherein when the receiving beaker is in the second position, the brewing canister can be removed from the respective first or second holder independently from the receiving beaker.

6. A brewing device as in claim 5, wherein the brewing canister comprises a connector configured to engage the first holder so that the brewing canister is prevented from moving vertically relative to the frame.

7. A brewing device as in claim 6, wherein the receiving beaker is configured to be supported by the second holder so that the receiving beaker moves vertically with the lift.

8. A brewing device as in claim 7, wherein the second holder is configured so that when the receiving beaker is engaged with the second holder on the lift, and the brewing canister is engaged with the first holder, the receiving beaker is aligned with the brewing canister.

9. A brewing device as in claim 1, wherein the sealing member is supported by the brewing canister.

10. A brewing device as in claim 9, wherein the brewing canister comprises a first end and a second end, the filter being disposed at or adjacent the second end, and wherein the sealing member is arranged between the first end and the second end.

11. A brewing device as in claim 9, wherein the brewing canister comprises a first end and a second end, the brewing canister being open at the first end, a removable cap being disposed at the second end, the removable cap comprising a filter seat configured to releasably receive the filter, the filter being held securely in place when the cap is attached to the brewing canister, the filter being removable from the filter seat when the cap is removed from the brewing canister.

12. A brewing device as in claim 11 additionally comprising a filter support that interchangeably fits into the filter seat of the cap in place of the filter, and additionally comprising a compliant filter configured to be supported by the filter support when the cap is attached to the brewing canister.

* * * * *